United States Patent [19]

Gutek

[11] 4,404,305

[45] Sep. 13, 1983

[54] FLAME RETARDANT POLYORGANOSILOXANE RESIN COMPOSITIONS

[75] Inventor: Beth I. Gutek, Freeland, Mich.

[73] Assignee: Dow Corning Corporation, Midland, Mich.

[21] Appl. No.: 349,214

[22] Filed: Feb. 16, 1982

[51] Int. Cl.³ .............................................. C08L 83/04
[52] U.S. Cl. .................................... 524/118; 524/142; 524/149; 524/288; 524/307; 524/316; 524/341; 524/371; 524/411; 524/412; 524/469; 524/471; 524/494; 524/588; 524/847
[58] Field of Search ............... 524/411, 412, 494, 588, 524/847, 118, 142, 149, 288, 307, 316, 341, 371, 469, 471; 523/219, 223

[56] References Cited

U.S. PATENT DOCUMENTS

| | | | |
|---|---|---|---|
| 2,684,349 | 7/1954 | Whelton | 260/37 |
| 2,891,033 | 6/1959 | Savage | 260/37 |
| 3,154,515 | 10/1964 | Berridge | 260/33.8 |
| 3,514,424 | 5/1970 | Noble et al. | 260/37 |
| 3,553,002 | 1/1971 | Haraway et al. | 523/219 |
| 3,635,874 | 1/1972 | Laur et al. | 260/37 SB |
| 3,639,155 | 2/1972 | Hartlein et al. | 428/447 |
| 3,734,877 | 5/1973 | Christie | 260/37 SB |
| 3,734,881 | 5/1973 | Shingledecker | 260/37 SB |
| 3,912,792 | 10/1975 | Touval | 524/588 |

FOREIGN PATENT DOCUMENTS

| | | |
|---|---|---|
| 3002867 | 7/1981 | Fed. Rep. of Germany . |
| 53/16883 | 2/1978 | Japan . |
| 1399172 | 6/1975 | United Kingdom . |
| 555122 | 2/1977 | U.S.S.R. .............. 524/469 |

*Primary Examiner*—Lewis T. Jacobs
*Attorney, Agent, or Firm*—Robert Spector

[57] ABSTRACT

Translucent polyorganosiloxane resin compositions exhibiting acceptable levels of flame retardancy contain from 1 to 10%, based on resin weight, of an organic halogen source in combination with finely divided glass particles. Translucent substrates coated with these resin compositions can be used in the exterior portions of buildings intended to be heated at least in part by solar energy.

12 Claims, No Drawings

FLAME RETARDANT POLYORGANOSILOXANE RESIN COMPOSITIONS

BACKGROUND OF THE INVENTION AND DESCRIPTION OF THE PRIOR ART

This invention relates to flame-retardant resin compositions. More particularly, this invention relates to flame retardant, silicone resin compositions suitable for use as translucent coating materials for a variety of substrates, including fabrics formed from glass fibers, and to translucent fibrous substrates coated with these resin compositions.

In recent years there has been an increasing interest in new construction materials for the exterior portions of buildings which can be heated using solar energy. In addition to transmitting at least a portion of the incident sunlight into the interior of the structure, these materials should be sufficiently durable to withstand prolonged exposure to the elements of weather and comply with the applicable building codes.

Panels of plate glass meet all of the foregoing criteria, and have heretofore been one of the preferred materials for solar heated buildings, particularly agricultural greenhouses. Glass panels do have a number of disadvantages, among which are their rigidity, brittleness and the requirement for a strong supporting framework due to their considerable weight. This framework must also provide for the thermally induced contraction and expansion exhibited by glass.

One alternative that avoids some of the foregoing disadvantages associated with using plate glass as a structural material is to replace the glass with sheets of relatively strong, high-melting organic polymers such as polymethyl methacrylate. While these polymers are lighter than glass, they do have other serious deficiencies, including relatively low resistance to abrasion and degradation caused by heat, weathering, and ultraviolet radiation. If incorporated into a permanent structure, panels formed from these polymers would have to be replaced periodically, thereby substantially increasing the maintenance costs of the structure.

The physical and chemical properties of organosilicone resins would make them one of the preferred materials for the exterior of solar heated buildings, were it not for the fact that these resins are usually not strong enough to form self-supporting films. When the resins are coated onto a suitable substrate such as a fabric formed from glass fibers, the resultant material is flexible and translucent or transparent, depending upon the closeness of the weave in the fabric. This material could be used for the exteriors of tension- or air-supported structures if it were made sufficiently flame retardant to comply with current regulations pertaining to the flammability of construction materials while still retaining at least a substantial fraction of the light transmittance exhibited by the unmodified resin-coated fabric.

Most silicone resins exhibit excellent resistance to degradation during exposure to temperatures as high as 500° C., however these resins will burn if they are placed in a flame. The flammability of silicone resins has delayed their widespread use in products such as coatings for construction materials which must comply with regulations requiring that the final product be either non-burning or at least self-extinguishing within a specified time interval once the source of the flame has been removed. This requirement has provided the incentive to search for effective flame retarding agents suitable for use with organosilicone materials in general and polyorganosiloxane resins in particular.

The prior art discloses numerous classes of compounds that will function as flame retardants for organic polymers. A partial listing of commercially available materials from representative classes of flame retardants is contained in a text entitled "Flammability Handbook for Plastics" by Carlos J. Hilado (Technomic Publishing Company, Westport, Conn., 1974). Useful flame retardants can be divided into several classes, based on their chemical composition. These classes include compounds containing one or more of chlorine, bromine, phosphorus, nitrogen, antimony, boron and arsenic. Of these classes of compounds, the most effective flame retardants for organic polymers have been found to be those containing bromine, chlorine, and/or phosphorus. Antimony compounds are usually relatively poor flame retardants, however they have been shown to interact synergistically with many organic halogen-containing compounds.

It is well known that the mechanism by which flame retardation is achieved varies with the particular compound and polymeric substrate, as do the adverse effects which flame retardants have on the physical properties of the substrate and the concentration level at which these adverse effects become apparent. Once this level is exceeded, the physical properties of the substrate often degrade to the extent that the utility of the substrate is destroyed for all practical purposes.

Flame retarding agents that have been proposed for use with elastomeric polysiloxanes include platinum and fumed titanium dioxide, optionally in combination with carbon black (U.S. Pat. No. 3,635,874 to T. L. Laur and P. Lamont), platinum compounds in combination with conventional fillers (U.S. Pat. No. 3,514,424 to M. G. Noble and J. R. Brower), finely divided copper or copper compounds in a vinyl-containing polymer (U.S. Pat. No. 2,891,033 to R. M. Savage), powdered copper or copper compounds and various chlorinated organic compounds (U.S. Pat. No. 3,154,515 to C. A. Berridge and British Patent No. 1,399,172) and a platinum compound in combination with triphenyl phosphite (U.S. Pat. No. 3,734,877 to G. Christie). The combination of carbon black and platinum as a flame retardant for a specified class of elastomeric polydiorganosiloxanes is disclosed in U.S. Pat. No. 3,734,881 to R. A. Shingledecker.

Experimental data in a subsequent portion of this specification demonstrate that platinum is a virtually ineffective flame retardant for coatings of polysiloxane resins.

Using a combination of powdered glass and mica to flame retard various coatings, including polysiloxane resins, that are applied on fiber substrates is taught in Japanese Patent Publication No. 53/16883.

Flame retardant polyorganosiloxane elastomers containing a brominated diphenyl ether as the flame retarding agent and chalk as a filler are disclosed in German Offenlegungsschrift No. 3,002,867.

U.S. Pat. No. 2,684,349 teaches that finely divided glass, preferably in the form of glass frit having an average particle size below 15 microns, can be employed in combination with conventional fillers, such as silica, calcium carbonate and titanium dioxide, to improve the flame retardant properties of elastomeric polyorganosiloxanes employed as coating materials for various substrates, including cloth woven from glass fibers.

Particles larger than about 15 microns are undesirable since they may adversely affect desirable properties of the polyorganosiloxane.

While it is true that halogen-containing compounds such as the brominated diphenyl ethers disclosed in the aforementioned German Offenlegungsschrift No. 3,002,867 and fillers such as chalk and titanium dioxide impart useful levels of flame retardancy to polyorganosiloxane elastomers and resins, the specific formulations disclosed in the prior art employ these compounds at concentration levels that would render the material into which they are incorporated virtually opaque, and therefore useless as a light-transmitting coating material.

It is therefore an objective of this invention to define a class of flame retardants that can be incorporated into polyorganosiloxane resins at concentration levels that impart a desired level of flame retardancy while retaining a useful fraction of the light transmittance exhibited by films of the unmodified resin.

It is also an objective of this invention to provide flame-retardant organosilicone resin compositions that can be applied as translucent coatings on a variety of substrates, including glass fibers.

As used in this specification and the accompanying claims, an organosilicone resin is defined as translucent if a film of the resin containing an additive will transmit at least 30% of the incident sunlight transmitted by a film of the same thickness formed from the same resin without the additive.

It has now been found that the foregoing objectives can be achieved using a combination of a bromine- or chlorine-containing organic compound and finely divided glass particles. The composition may also include compounds such as antimony trioxide, which are known to interact synergistically with halogen-containing flame retardants.

SUMMARY OF THE INVENTION

This invention provides flame retardant, translucent compositions comprising (1) 100 parts by weight of a polyorganosiloxane resin, (2) from 1 to 10 parts by weight of an organic compound containing at least one halogen atom selected from the group consisting of chlorine and bromine, wherein the organic compound is selected from the group consisting of hydrocarbons, mono- and polyfunctional alcohols, mono- and polyfunctional carboxylic acids and esters derived either from said alcohols and carboxylic acids or from said alcohols and inorganic acids, and (3) from 10 to 100 parts by weight of finely divided glass particles having an average particle size of from 5 to 100 microns; the weight ratio of the halogen-containing organic compound to the glass particles being from 0.05 to 0.4.

This invention also provides flame retardant, translucent articles of manufacture comprising a translucent fibrous substrate and a coating on said substrate, said coating comprising at least one of the flame retardant resin compositions of this invention. In preferred embodiments the fibrous substrate is a cloth formed from glass fibers. Most preferably the cloth is first coated with an elastomeric polydiorganosiloxane which is cured to form an inner layer, followed by application and curing of a flame retardant resin composition of this invention as an outer layer.

DETAILED DESCRIPTION OF THE INVENTION

1. The Organic Halogen Source

The halogen-containing component of the present flame retardant compositions can be any organic compound containing at least one bromine or chlorine atom bonded to a carbon atom. Alternatively the compound can contain both bromine and chlorine. The carbon atoms can, in turn, be part of an aromatic, aliphatic, or cycloaliphatic hydrocarbon group that contains from 1 to 20 or more carbon atoms. The cycloaliphatic hydrocarbon can be mono- or bicyclic and may contain one or more double bonds between adjacent carbon atoms. These halogen-containing flame retardants include hydrocarbons, mono- and polyfunctional carboxylic acids, mono- and polyfunctional alcohols and esters derived from (1) said alcohols and inorganic acids, or (2) said carboxylic acids and mono- or polyfunctional alcohols. Esters of phosphorus-containing acids are particularly preferred inorganic acids since phosphorus compounds are known flame retardants.

A partial listing of commercially available halogen-containing flame retardants and the manufacturers of these materials appears on pages 156 to 170 of the aforementioned text entitled "Flammability Handbook For Plastics" by Carlos J. Hilado, the disclosure of which is hereby incorporated by reference.

One of the objectives of the present invention is to provide translucent flame retardant resin compositions. It would therefore be preferable to minimize the concentration of opaque materials in the composition, including solid flame retardants. Since the level of flame retardancy imparted by organic halogen sources is usually directly related to the concentration of halogen in the composition rather than the concentration of the halogen source, and bromine is usually a more effective flame retardant on an equal weight basis than chlorine, it would be preferable to employ compounds with the highest bromine content. A preferred class of compounds would therefore include bromine-containing aromatic hydrocarbons and brominated diphenyl oxide. Commercially available compounds of this class include brominated biphenyls such as decabromobiphenyl and brominated diphenyl oxides such as decabromodiphenyl oxide. These brominated diphenyl oxides and diphenyl compounds contain from 6 to 10 bromine atoms per molecule.

In order to obtain a polysiloxane resin composition that will transmit at least 30% of the incident light transmitted by a coating of an unmodified resin, the concentration of opaque material in the resin should be less than about 10% by weight based on the resin. In preferred compositions the weight of opaque material, which usually consists essentially entirely of the halogen source and, optionally, an antimony compound, is from 4 to about 9% by weight of the composition.

Antimony compounds, particularly antimony oxide, are known to interact synergistically with many organic halogen sources to substantially increase the efficacy of the halogen source as a flame retardant. The antimony compound is conventionally employed at concentrations of from about 1 to about 10% based on the weight of the halogen source.

2. The Finely Divided Glass Particles

Any form of finely divided glass wherein the average particle size is from about 5 to about 100 microns (from $13 \times 10^{-3}$ to $260 \times 10^{-3}$ centimeters) is suitable for use lar weight of the resin, it may be a solid or liquid at room temperature. Solid, uncured resins are usually soluble in liquid aromatic hydrocarbons, such as toluene and xylene, and are conventionally prepared using these solvents. The resin composition, which also includes the glass particles halogen source and, optionally, antimony trioxide and a curing catalyst, can be applied to the substrate by any of the known techniques, such as by dipping the fabric in the resin composition or by the use of a doctor blade.

The resin coating is cured at ambient or elevated temperature, depending upon the type of resin and catalyst employed. Block copolymers such as those disclosed in U.S. Pat. No. 3,328,481 usually cure in a reasonably short time at temperatures above about 150° C. Other types of polyorganosiloxane resins may require higher or lower temperatures to achieve a reasonably rapid cure rate. Catalysts such as tetraalkyl titanates and cobalt naphthenate will accelerate the curing of any of the present resin compositions. Combinations of two or more catalysts can be employed if desired.

Glass fabrics coated with the flame retardant resin compositions of this invention can be used to form complete temporary buildings, such as tents, and all or a portion, such as the roof, of more permanent structures. The fabric can be supported by rigid members or by generating a positive air pressure differential between the interior and exterior of the structure. Fabrics coated with the translucent resin compositions of the invention are particularly suitable for structures such as the roofs of sports arenas and greenhouses which are intended to be heated, at least in part, by solar energy.

Polysiloxane resins are usually highly crosslinked, and fabrics coated with these resins may therefore not have sufficient flexibility for the desired end use application. It has been found that the flexibility of resin-coated fabrics can be substantially increased if the fabric is first coated with an elastomeric polyorganosiloxane, followed by application and curing of an outer layer of a polyorganosiloxane resin.

Polyorganosiloxane elastomers are well known in the art and can be cured using a variety of atmospheric conditions, catalysts, and temperatures. The choice of elastomer is not critical so long as it can be cured without damaging the substrate fabric. If the final coated fabric is to be used as a light transmitting medium, the elastomer should not contain any opaque additives such as pigments. Once it has been cured, the elastomer is coated with one of the translucent flame retardant resin compositions of this invention. Preferably the resin is of the block copolymer type such as described in U.S. Pat. No. 3,639,155, issued to Robert C. Hartlein and Harold L. Vincent, the relevant portions of which are hereby incorporated by reference. This patent also discloses using these resins as dirt-resistant coatings for elastomers.

In addition to those end use applications already disclosed, fabrics and other fibrous substrates coated with the present flame-retardant resin compositions can be utilized in numerous applications requiring chemically inert, flame-retardant materials. These applications include insulation for electrical devices, backing material for pressure-sensitive and other types of tapes, and as a material for preparing laminates such as the printed circuit boards currently employed in many electronic devices.

The following examples disclose preferred embodiments of the translucent, flame retardant resin compositions of this invention and should not be interpreted as limiting the scope of the accompanying claims. All parts and percentages are by weight unless otherwise specified.

EXAMPLE 1

This example demonstrates (1) the improvement in flame retardancy imparted to a resinous siloxane block copolymer, using decabromodiphenyl oxide, antimony trioxide and glass beads and (2) the considerably higher flammability observed when alumina trihydrate, usually considered a more effective flame retardant than glass, is substituted for the glass particles. Each of these materials was also individually evaluated as a flame retardant.

A coating composition (composition A) was prepared by combining

A. 600 parts of an essentially solventless organosiloxane block copolymer composition (composition B) obtained by combining the following materials identified as a, b, c and d, and removing volatile materials by distillation;
  a. 89 parts by weight of solubilized siloxane block copolymer described in U.S. Pat. No. 3,629,228, which is hereby incorporated by reference. The copolymer contained 50% by weight of $(CH_3)_2SiO$ groups, 38% of

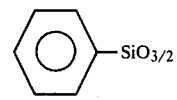

groups and 12% of $CH_3Si(OCH_3)_2O$ groups;
  b. 9 parts by weight of the reaction product of phenyltrimethoxy silane (56 parts) with 41 parts of a mixture of cyclic and low molecular weight linear polydimethylsiloxanes obtained by base catalyzed hydrolysis of dimethyldichloro silane. The reaction of the phenyltrimethoxy silane with the hydrolyzate was conducted in the presence of about 3 parts of water and an acid catalyst, and volatile by-products were removed by distillation;
  c. 2 parts of methyltrimethoxy silane and
  d. tetrabutyl titanate at a concentration of 0.5 part per 100 parts of block copolymer composition (composition B);

B. 6 parts of a poly(aminoalkoxymethyl siloxane) described in U.S. Pat. No. 3,524,900, which is hereby incorporated by reference. The siloxane was prepared by reacting a trimethylsiloxy-terminated polymethylhydrogen siloxane wherein the molar ratio of methyl groups to silicon atoms was 1.1:1 with a stoichiometric amount, based on the number of silicon-bonded hydrogen atoms, of 2-(N,N-dimethylamino)-1-ethanol;

C. 150 parts (25%, based on the weight of the aforementioned organosiloxane block copolymer composition, composition B), of glass beads (U.S. Sieve Series No. 325 and finer) that had been pretreated with an amino substituted silane (Potters Beads 3000-03);

D. 15 parts (2.5% by weight, based on composition B) of antimony trioxide and

E. 34 parts (5.7% by weight, based on composition B) of decabromodiphenyl oxide.

A control coating formulation was prepared using the foregoing procedure and ingredients, with the excepin the present resin compositions and the maximum particle size is preferably below 150 microns. A preferred particle size range is from about 5 to about 40 microns. The glass particles can be solid or hollow and constitute from 10 to about 150 by weight of the resin, preferably from 20 to 50%. The concentration level at which the glass particles begin to adversely affect the physical properties of the resin is usually inversely proportional to the average size of the particles, and it may therefore be desirable to keep the concentration of glass below this level, which can readily be determined by routine experimentation.

The forms of glass that can be employed include frit, solid beads, and hollow microspheres, all of which are commercially available.

3. The Organosilicone Resin

Resinous materials derived from the polymerization and subsequent crosslinking of silanes and siloxanes containing an average of more than two hydrolyzable groups per silicon atom are well known in the art. Silicone resins have been prepared by hydrolyzing a silane containing three hydrolyzable groups such as halogen or alkoxy on the silicon atom or a mixture of silanes and/or siloxanes wherein the average numerical ratio of silicon-bonded hydrocarbon groups to silicon atoms is from 1.1 to about 1.8. The resultant product is preferably soluble in organic liquids, particularly aromatic hydrocarbons such as toluene and xylene. These precursors can be converted to insoluble, resinous materials by heating them at elevated temperatures, e.g. about 150° C. Resin precursors of this type are disclosed in U.S. Pat. No. 2,447,611 to W. R. Collings et al. and U.S. Pat. No. 2,706,190 to Harold A. Clark, which patents are hereby incorporated by reference.

A second class of organosiloxane resins which are suitable for use in the coating compositions of this invention are the block copolymers described in U.S. Pat. No. 3,629,228 to Robert C. Hartlein and Carl R. Olson, which is hereby incorporated by reference.

A preferred class of block copolymers comprise (1) at least one block corresponding to formula I

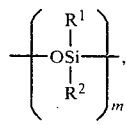

(2) at least one block wherein the repeating unit corresponds to formula II

and (3) at least one unit of the formula

In these formulae $R^1$, $R^2$, $R^3$, $R^4$ and $R^5$ represent identical or different hydrocarbyl groups, m represents an integer from 10 to 100 or more and the average value of n is from 1 to 1.4. These hydrocarbyl groups contain from 1 to 18 carbon atoms, can be either saturated or unsaturated, and may contain one or more atoms or groups such as halogen atoms that are non-reactive under the conditions employed to prepare the resin. Suitable hydrocarbyl groups include alkyl, alkenyl, haloalkyl, cycloalkyl, aryl, alkaryl (e.g. tolyl) and aralkyl (e.g. benzyl). A preferred substituted hydrocarbyl group is 3,3,3-trifluoropropyl.

Preferably the hydrocarbon groups bonded to silicon are lower alkyl containing from 1 to 4 carbon atoms, vinyl or phenyl. Most preferably $R^1$, $R^2$, $R^4$ and $R^5$ in the foregoing formulae I and III are methyl and $R^3$ in formula II is phenyl. The repeating unit represented in the foregoing formula I preferably constitutes from 24 to 84 mole percent of the copolymer and the repeating units represented by formulae II and III constitutes from 11 to 68 mole percent and from 2 to 27 mole percent, respectively, of the copolymer.

A variety of polyorganosiloxane resins are available from commercial suppliers of these materials.

The liquid or solubilized polyorganosiloxane resin, organic halogen source, and finely divided glass particles can be combined using any conventional blending method that will uniformly disperse the additives throughout the resin composition. Depending upon the viscosity of the composition, these methods include high- or low-speed stirring in a Banbury or other type of mixing apparatus and the use of two- or three-roll mills or extruders. Additional solvents and other conventional additives such as heat stabilizers, plasticizers and viscosity modifiers can also be added to the resin composition so long as the additives do not reduce the light transmittance of the final resin coating below the desired 30% level.

The flame retardant resin compositions of this invention are unique by virtue of their ability to transmit in film form at least 10% of the incident sunlight transmitted by a resin film of identical thickness in which no additives are present while exhibiting a level of flame retardancy that is above the minimum specified by regulations governing construction materials.

As previously disclosed, to achieve a translucent coating the concentration of any opaque filler, including the halogen-containing component of the present flame retarding agents, should be less than about 10% based on resin weight. If the halogen-containing component is decabromodiphenyl oxide, a concentration of 10% is equivalent to a bromine content of 8.3% based on resin weight. The composition exemplified in the aforementioned German Offenlegungsschrift 3,002,867 employs 38% by weight of octobromodiphenyl oxide, based on total polydiorganosiloxane, which is equivalent to about 31.6% by weight of bromine.

Surprisingly, it has been found that finely divided glass not only does not significantly reduce the light transmittance of the unmodified polysiloxane resin, but the glass also interacts synergistically with the organic halogen source, thereby substantially reducing the amount of halogen source required to achieve a desired level of flame retardancy. By replacing a portion of the halogen source with glass, it is possible to reduce the required concentration of halogen source to a level that retains at least 30% of the light transmittance of the unmodified resin. This cannot be achieved in the absence of the glass particles.

As previously disclosed, the translucent flame retardant organopolysiloxane resin compositions described in this specification and the accompanying claims can be employed to coat a variety of substrates. In accordance with a preferred embodiment, the substrate is a fabric woven from glass fibers and is coated using one of the resin compositions of this invention in liquid or solubilized form. Depending upon the type and molecution that an equal weight of alumina trihydrate was substituted for the glass beads. Each formulation was blended using a high speed stirrer until a homogeneous mixture was obtained.

A woven glass fiber cloth (Style 81564 from J. P. Stevens, plain weave, 12 ounce weight) was heat treated to remove the spin finish which had been applied to the yarn prior to weaving. The cloth was then dipped into a 25% by weight solution in 1,1,1-trichloroethane of a room temperature, vulcanizable polydimethylsiloxane elastomer with acetoxy end groups on the polymer molecules. The treated cloth was then heated at a temperature of 100° C. for 10 minutes to cure the elastomer, after which the cloth was dipped into a polyorganosiloxane resin coating composition containing the desired additive. The excess coating composition was removed by passing the cloth through a set of wiper bars, following which the cloth was heated at a temperature of 100° C. for 10 minutes to cure the resin. The resultant product was a glass cloth coated with a silicone elastomer. The elastomer was, in turn, completely covered by an adherent top coat of a polyorganosiloxane resin.

The flammability of the coated cloth samples was evaluated using the vertical burning test described in sections 3.10–3.13 of schedule UL 94, issued by Underwriter's Laboratory, with the exception that the layer of absorbant cotton and the second application of the flame were omitted.

In accordance with the aforementioned test procedure, a sample of the material to be tested measuring 5 inches (13 cm.) long by 0.5 inch (1.3 cm.) wide was clamped in a vertical position and the flame of a Bunsen or Tirill burner was applied against the lower horizontal edge of the sample for a period of ten seconds. If less than a one inch (2.5 cm.) length of the sample was consumed by the flame, the time interval during which the sample continued to burn after the flame had been removed was recorded. Three samples of each resin formulation were evaluated and the results were averaged. To qualify as an architectural fabric under current flammability standards, a sample should cease to burn, i.e. the flame should self-extinguish, within five seconds after the igniting flame is removed. If more than a one inch length of the sample is consumed by the flame, the sample is classified as having failed the test and the burning time is not recorded.

The light transmittance values for this standard and the samples identified as A-E in the preceding table were determined using a pyroheliometer in accordance with ASTM procedure E 424, method B using a sample size of 12 inches by 12 inches (30×30 cm).

To determine the efficacy of the four aforementioned additives (decabromodiphenyl oxide, antimony trioxide, glass beads and alumina trihydrate) as flame retardants, each was evaluated individually in accordance with schedule UL 94 with the aforementioned exceptions. In each instance the composition employed to coat the glass fiber cloth contained 400 parts of the aforementioned organosiloxane block copolymer composition (composition B) and 4 parts of the aforementioned poly(aminoalkoxymethyl siloxane). A sample without any flame retardants was prepared to obtain the light transmittance of glass cloth coated with an unmodified resin.

The type and concentration of additives present in each of the six samples evaluated for flammability together with the result of this evaluation are summarized in the following table 1. The burning times recorded represent an average of three samples.

TABLE 1

| Sample | Additives (% by weight, based on copolymer composition B) | | | | Burn Time (Seconds) or Failure[1] | Sunlight Transmittance (%)[4] |
|---|---|---|---|---|---|---|
| | DBDO[3] | $Sb_2O_3$ | Glass | $Al_2O_3 \cdot 3H_2O$ | | |
| A | 5.7 | 2.5 | 25 | 0 | 3 | 26 |
| B(control) | 5.7 | 2.5 | 0 | 25 | fail | 22 |
| C(control) | 7.3 | 2.5 | 0 | 0 | 7[2] | 30 |
| D(control) | 0 | 0 | 50 | 0 | 9 | 41 |
| E(control) | 0 | 0 | 0 | 50 | fail | 31 |
| F(control) | 0 | 0 | 0 | 0 | fail | 50 |

Notes
[1]Sample rated a failure if the length burned exceeded one inch (2.5cm)
[2]One of the three samples rated as failure
[3]DBDO = decabromodiphenyl oxide
[4]% of incident sunlight. Determined using ASTM E 424 Method B The fact that samples B and E failed the flammability test indicates that alumina is not an effective flame retardant for polyorganosiloxane resins of the type employed in the compositions of this invention.

Neither the combination of bromine compound and antimony oxide, employed in control sample C at a combined level of 9.8% nor the glass beads, employed in control sample D at a level of 50%, imparted the degree of flame retardancy observed for sample A, which contained only 83.7% of the weight of bromine compound-antimony oxide mixture of control sample c and only ½ of the weight of glass present in control sample D. Sample A exhibited a burning time of only 3 seconds compared with 7 and 9 seconds for the controls. Sample A also transmitted 50% of the light transmitted by sample F, the unmodified control.

The standard employed to measure light transmittance values was sample F, a coated cloth prepared as described in this example, with the exception that no additives were present in the resin.

EXAMPLE 2

This example demonstrates the efficacy of various halogen-containing organic compounds alone and in combination with glass beads as flame retardants for polyorganosiloxane resins.

The formulations employed to evaluate the flame retardants contained 76% by weight of the block copolymer identified as copolymer C in the preceeding example 1. In addition to the desired flame retardant the formulation also contained 20% by weight of toluene, 3% unreacted methyltrimethoxy silane, 0.41% tetrabutyl titanate, 10 parts per million, based on copolymer weight, of ferric octoate and 1 part, based on copolymer weight, of the poly(aminoalkoxymethyl siloxane) referred to as polysiloxane D in the preceeding example 1. The final formulation was blended using a high speed stirrer until a homogeneous composition was obtained. Films measuring 12.7 cm by 6.5 mm by about 3 mm in thickness were prepared by casting onto a paper backing. After exposure to ambient conditions for 2 days and curing at 100° C. for 1 hour, the flammability of the films was evaluated by determining the minimum concentration of oxygen in an oxygen-nitrogen mixture that will support flaming combustion. This concentration value is referred to as the limiting oxygen index (LOI). A procedure for determining LOI values is described in ASTM test procedure D2863-74. In accordance with this procedure the sample is held in a vertical position within a glass tube. A mixture of oxygen and nitrogen is metered into the bottom of the tube at a rate of 4±1 cc per second through a bed of glass beads that is from, 80 to 100 mm deep. The sample is then ignited by applying a flame at the upper end of the sample. The limiting oxygen index is defined as the minimum oxygen content that will permit the sample to burn for a length of 50 mm or for a period of three minutes.

The composition and concentration of the flame retardants evaluated together with the limiting oxygen index values for the resin containing these flame retardants are set in the following table together with the limiting oxygen index value for a resin sample which did not contain any flame retardant.

TABLE 2

| Sample No. | Halogen Compound (parts)[1] | $Sb_2O_3$ (parts) | Glass Beads (parts) | LOI Value |
|---|---|---|---|---|
| 1 (control) | None | 0 | 0 | 41 |
| 2 (control) | None | 3 | 0 | 41 |
| 3 (control) | None | 0 | 30 | 59 |
| 4 (control) | Decabromodiphenyl Oxide (8.4) | 0 | 0 | 52 |
| 5 (control) | Decabromodiphenyl Oxide (7.2) | 2.4 | 0 | 55 |
| 6 | Decabromodiphenyl Oxide (5.0) | 2.0 | 25 | 66 |
| 7 (control) | Dibromoneopentyl Glycol (9.9) | 0 | 0 | 42 |
| 8 | Dibromoneopentyl Glycol (9.9) | 2.0 | 25 | 62 |

[1]parts by weight based on 100 parts of block copolymer.

A comparison of the limiting oxygen index values for samples 4 and 5 indicates that partial replacement of decabromodiphenyl oxide by antimony trioxide yields a 6% increase in the LOI value, a relatively small but significant improvement. By comparison, reducing the amounts of this halogen compound and antimony trioxide by 30 and 17%, respectively, accompanied by the addition of 25 parts of glass beads (sample 6) increases the LOI value by 20% to 66. This value is 12% higher than can be achieved using a higher concentration (30 parts) of glass beads alone (sample 3), the most effective flame retardant in terms of LOI values.

The 48% increase in the LOI value observed by adding 2 parts of antimony trioxide and 25 parts of glass beads to dibromoeopentyl glycol (sample 8) is considerably greater than would be expected from the contributions of the individual components (samples 2, 3 and 7). The concentrations of antimony trioxide and glass beads are considerably higher in the controls than in sample 8.

EXAMPLE 3

This example demonstrates the failure of platinum compounds to effectively flame retard glass fiber cloth coated with a polyorganosiloxane resin containing the platinum compound. A glass fiber cloth was heat treated to remove a portion of the spin finish applied prior to the weaving operation. The fabric was coated as described in the preceeding example 1 with the block copolymer composition identified as copolymer C. In this instance the cloth was not coated with an elastomeric polydiorganosiloxane. The resin composition also contained 20% by weight of toluene, 3% unreacted methyltrimethoxysilane, 0.41% tetrabutyl titanate, 10 parts per million, based on copolymer weight of ferric octoate and 30 parts per million of the neutral reaction product of chloroplatinic acid hexahydrate and sym-divinyltetramethyldisiloxane described in example 1 of U.S. Pat. No. 3,419,593. The entire portion of this patent is hereby incorporated by reference. After the resin coating had been dried and cured, the sample was held in a vertical position and a flaming match was applied to the lower edge of the sample for 10 seconds. The sample ignited and burned completely.

For purposes of comparison, a cloth sample was coated with a resin formulation identical to the one previously described in this example with the exception that the formulation contained 50 parts of alumina trihydrate in place of the platinum compound. When a flaming match was held against the lower edge of the sample for ten seconds, only the edge was charred and the sample did not ignite in contrast to the previously described sample coated with the platinum-containing resin formulation.

That which is claimed is:

1. A translucent, flame retardant composition consisting essentially of
   A. 100 parts by weight of a polyorganosiloxane resin,
   B. from 1 to 10 parts by weight of an organic compound containing at least one halogen atom, selected from the group consisting of bromine and chlorine, and
   C. from 10 to 100 parts by weight of glass particles having an average particle size are from 5 to 100 microns;
the weight ratio of said organic compound to the glass particles being from 0.05 to 0.4.

2. A composition according to claim 1 wherein the organic compound is selected from the group consisting of aromatic hydrocarbons, diphenyl oxide, cycloaliphatic hydrocarbons, aliphatic hydrocarbons, mono- and polyfunctional alcohols, mono- and polyfunctional carboxylic acids, esters of said mono- and polyfunctional carboxylic acids, and esters of said mono- and polyfunctional alcohols with inorganic or carboxylic acids.

3. A composition according to claim 2 wherein the organic compound is an ester of a mono- or polyfunctional alcohol with a phosphorus containing acid.

4. A composition according to claim 1 or claim 2 wherein the halogen is bromine.

5. A composition according to claim 2 wherein the organic compound is an aromatic hydrocarbon or diphenyl oxide.

6. A composition according to claim 5 wherein the organic compound is diphenyl oxide or biphenyl and contains from 6 to 10 bromine atoms per molecule.

7. A composition according to claim 1 wherein the average size of the glass particles is from 15 to 40 microns and the concentration of the particles is from 20 to 50 parts by weight per 100 parts of polyorganosiloxane resin.

8. A composition according to claim 1 wherein the polyorganosiloxane resin is a block copolymer comprising (1) from 24 to 84 mole % of at least one block corresponding to formula I

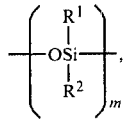
  I (2) from 11 to 68 mole % of at least one block wherein the repeating unit corresponds to formula II $R_n^3SiO_{(4-n)/2}$   II and (3) from 2 to 27 mole % of at least one end group of the formula $R^4(R^5O)_2SiO-$ where $R^1$, $R^2$ $R^3$, $R^4$ and $R^5$ are identical or different hydrocarbyl or halohydrocarbyl groups, m represents an integer from 10 to 100, and the average value of n is from 1 to 1.4.

9. A composition according to claim 8 wherein $R^1$ and $R^2$ are lower alkyl and contain from 1 to 4 carbon atoms.

10. A composition according to claim 9 wherein $R^1$ and $R^2$ are methyl.

11. A composition according to claim 10 wherein $R^1$, $R^2$, $R^4$ and $R^5$ are methyl and $R^3$ is phenyl.

12. A composition according to claim 8 wherein the repeating unit represented in formula I constitutes from 40 to 60% by weight of the polyorganosiloxane resin.

* * * * *

UNITED STATES PATENT AND TRADEMARK OFFICE
CERTIFICATE OF CORRECTION

PATENT NO. : 4,404,305
DATED : September 13, 1983
INVENTOR(S) : Beth I. Gutek

It is certified that error appears in the above—identified patent and that said Letters Patent is hereby corrected as shown below:

Column 10, Line 60 - Delete "identified as copolymer C"
and substitute therefor
--- described --- .

Column 10, Lines 66 and 67 - Delete "referred to as
polysiloxane D"
and substitute therefor
--- described --- .

Column 12, Lines 3 and 4 - Delete "block copolymer composition
identified as copolymer C"
and substitute therefor
--- identical block copolymer --- .

Signed and Sealed this

Twenty-first Day of February 1984

[SEAL]

Attest:

GERALD J. MOSSINGHOFF

Attesting Officer

Commissioner of Patents and Trademarks